UNITED STATES PATENT OFFICE 2,191,981

CATALYST AND METHOD OF PREPARING THE SAME

Fredrik W. de Jahn, New York, N. Y., assignor to Alan N. Mann, Scarsdale, N. Y.

No Drawing. Application April 29, 1938, Serial No. 205,006

7 Claims. (Cl. 23—234)

The classical method of oxidizing hydrochloric acid to produce chlorine is the Deacon process exemplified by U. S. Patent No. 85,370, of December 29, 1868, in which Deacon conducts the operation in the presence of a copper compound such as copper chloride or copper sulphate. Actually, the commercial operations have used cupric chloride. Many attempts have been made to improve on the Deacon operation, but heretofore none of them have made any marked advance over Deacon's process.

One of the drawbacks to the use of copper as a catalyst in the Deacon process is that the life of the catalyst is rather short, due to the fact that at the temperature of reaction, the cupric chloride tends to volatilize and distil over.

In an attempt to overcome this difficulty and to improve the efficiency of the catalyst, I have tried other catalysts such for example as vanadium compounds. Vanadium (usually in the form of the oxide) has been suggested as a catalyst for various purposes, but this metal in its usual compounds is totally worthless for the present purpose, as the chloride or oxy-chloride is formed by the action of hydrochloric acid and both the chlorides and oxy-chlorides are volatile at temperatures substantially below those necessary for the reaction to which this application relates. However, I have discovered that it is possible to produce a compound combining copper and vanadium together with oxygen and chlorine which has an efficiency at least as great as that of the cupric chloride and which is much more permanent, in that it does not distil over. This compound I term a copper vanadium oxy-chloride, but in giving it this name I do not intend to indicate the structural formula, for essentially the compound is a copper vanadate reacted with chlorine and it may be some sort of a double oxychloride of copper and vanadium. This compound, prepared on an appropriate inert carrier, has at least as great an efficiency as the cupric chloride of the Deacon process and a vastly longer life. Furthermore, I have discovered that if additional substances are included with the copper vanadium oxy-chloride, the efficiency of the catalyst can be enormously increased, but in all these cases it is essential that the catalytic mass comprise a substance containing copper, vanadium, oxygen and chlorine. Additional elements that may be present are beryllium, magnesium, bismuth or antimony. Cobalt and uranium may also be used on occasion.

All of these added elements are substances which readily form oxy-chloride compounds, and it is probable that other substances tending to form oxy-chlorides can also be used with or in substitution for some of the elements named. Of these elements, the use of magnesium or beryllium is the most important and I find it advantageous to use antimony or bismuth or cobalt with either magnesium or beryllium. Magnesium and beryllium both belong to the second periodic group and antimony and bismuth belong to group 5; cobalt does not belong to this same group, but for the purposes of this invention it is classified with antimony and bismuth.

In making up the catalyst, the copper and the vanadium in the form of appropriate compounds are caused to react and the other elements to be included are also added in an aqueous medium and ordinarily the hydroxides or compounds containing both oxygen and hydrogen are produced. In some instances additional elements can be added in the form of chlorine compounds but this is merely a matter of expediency and the addition of chlorine at this stage is not essential. The mixed compound which we may term the hydroxides are dried and calcined together with a carrier which may, for example, be clay or other well-known form of carrier. The resulting compound of the metallic elements, plus oxygen, will be found to have substantially no activity as a catalyst for oxidizing hydrochloric acid but I have found that it can be rendered active by the addition of chlorine to the mass. Such addition of chlorine can be had by passing hydrochloric acid and oxygen through the catalyst under conditions similar to those used for the oxidation reaction, but the activation is carried out more rapidly if the oxide body is treated with hydrochloric acid and oxygen separately. Apparently the hydrochloric acid forms the essential chlorine compound in the mass and subsequent flushing with oxygen removes any uncombined bodies and the released hydrogen. It may be that the oxygen assists in decomposing the hydrochloric acid which has been taken up by the mass and thereby assists in the formation of the chlorine compound.

In preparing the catalyst, consideration has to be given to the fact that the vanadium chlorides and oxy-chlorides are readily volatile and since the loss of these compounds would be expensive and also would tend to clog the apparatus with which they were used, it is advisable to use a sufficient quantity of copper or copper and magnesium to combine with the vanadium to form a salt or compound which is relatively stable. Actually, I find it advisable to have one molecule of copper present for each molecule of vanadium so that in the course of preparation all of the vanadium may appear as copper vanadate (Cu(VO₃)₂). In the same way, it is not advisable to have an excess of copper present though excess copper is not as harmful as excess vanadium, since it volatilizes much more slowly. If antimony or bismuth are present with the vanadium, they may tend to stabilize excess copper in addition to acting as promoters of the efficiency of the catalyst. If, however, these substances are present, the proportions used ordinarily will be relatively small. For example, the sum of the two usually will not be equal to more than half the molecular proportion of the copper, and ordinarily I will use even less than this.

A convenient way of preparing the catalyst is to first prepare a slurry of magnesium vanadate in an aqueous medium and then add copper in the form of cupric chloride in approximately the stoichiometric proportions to form copper vanadate and magnesium chloride. If bismuth is added, this is preferably in the form of a nitrate and antimony will be added in the form of the chloride. The resulting compounds are dried and preferably tableted and then heated to drive off all water (including any water of combination) and then the dried tablets are subjected to the action of anhydrous hydrochloric acid gas, at a temperature between 350° to 400° C.

The catalyst thus produced may subsequently be employed for oxidation of hydrochloric acid preferably by passing the hydrochloric acid in vapor form together with only approximately theoretical quantities of oxygen (one volume of oxygen with four volumes of hydrochloric acid) or even less than theoretical quantities, through the catalytic mass at a temperature of between 350° and 400° C. For the purposes of illustration, the following are specific examples of catalysts which I have made in accordance with this invention:

Catalyst I

About 85½ parts by weight of $CuCl_2 2H_2O$ are reacted with about 42½ parts by weight of sodium hydroxide in aqueous solution to form a precipitate of $Cu(OH)_2$. This precipitate is washed until free from sodium chloride and then the precipitate is boiled in water with about 200 parts by weight of $V_2O_5$ and about 12½ parts by weight of BeO until complete reaction between $V_2O_5$ and $Cu(OH)_2$ takes place. About 45 parts by weight of $SbCl_3$ and 20 parts by weight of $Mg(OH)_2$ are then added to the mixture. After this enough water is added to make a slurry. Then about 360 parts by weight of kaolin are added and the whole mass is mixed thoroughly. The mass is then evaporated to dryness and after the mass is dried, it is heated at about 150° C. overnight or for about 12 hours. The heated and dried mass is then pulverized and compressed into tablets or pellets of a suitable size. These pellets are then heated for about 6 hours in an oxidizing atmosphere, such as air, at about 35° C. After this heating, the pellets are allowed to cool and are then placed in the chamber (which may be the chamber which later will be used for oxidizing) and hydrochloric acid gas is then passed through at a temperature of from 350° C. to 400° C. at an approximate space velocity of 10,000 cc. of gas per 300 cc. of catalyst per hour until no more hydrochloric acid is absorbed. This usually will require about 6 hours or more. Oxygen may then be passed through the catalyst and this will result in the formation and release of some chlorine. After the evolution of chlorine substantially ceases, the catalyst may be used, or successive treatments with hydrochloric acid and oxygen may be repeated. An alternative procedure permits the passage of the hydrochloric acid and oxygen through the catalyst at the same time but this method of activating the catalyst is slower and less efficient than the procedure outlined above.

Catalyst II

Another catalyst may be made as follows: About 210 parts by weight of $NH_4VO_3$ are boiled in water with about 54 parts by weight of $Mg(OH)_2$ until the reaction is complete and no more ammonia is evolved. Then about 165 parts by weight of $CuCl_2 2H_2O$ and about 25 parts by weight of $Bi(NO_3)_3 5H_2O$ are added. Then kaolin is mixed into the mixture, the mixture evaporated to dryness, formed into pellets and treated as given above in the first example of the catalyst.

Catalyst III

Another catalyst may be made as follows: About 67 parts by weight of $V_2O_5$ are stirred in water with about 18 parts by weight of $Mg(OH)_2$ and the mixture is kept boiling until the reaction is complete which is apparent when the red color of the vanadium pentoxide disappears. Then about 54 parts by weight of $CuCl_2 2H_2O$ and about 10 parts by weight of $Bi(NO_3)_3 5H_2O$ are added. Kaolin is added to the mixture and thoroughly mixed in and then the mixture is boiled down to dryness, heated, made into pellets, etc. in the same way as given above in the method of making the first catalyst.

Catalyst IV

Another catalyst may be made as follows: About 140 parts by weight of $NH_4VO_3$ are dissolved in water and boiled with about 36 parts by weight of $Mg(OH)_2$ until the reaction is complete and no more ammonia is evolved. Then about 110 parts by weight of $CuCl_2 2H_2O$ are stirred in. Kaolin is added and the mixture boiled down to dryness, heated, made into pellets etc., in the same way as set forth in the method of making the first catalyst.

Catalyst V

Another example of a catalyst was made as follows: About 135 parts by weight of $CuBe(VO_3)_2$ and about 26 parts by weight of $Bi(OH)_3$ are mixed in water to make a slurry. Then about 300 parts by weight of kaolin are added and mixed in. The mixture is boiled to dryness, heated, made into pellets, etc., as above set forth in connection with making the first catalyst.

Catalyst VI

Another catalyst may be made as follows: About 85½ parts by weight of $CuCl_2 2H_2O$ are precipitated with about 42½ parts by weight of sodium hydroxide in water to form $Cu(OH)_2$ as a precipitate. This precipitate is washed with water until free from sodium chloride and then is boiled in water with about 200 parts by weight of $V_2O_5$ until reaction is completed, and then about 12½ parts by weight of BeoO are added. To this mixture are then added about 300 parts by weight of kaolin and the mixture is boiled to dryness, heated, formed into pellets etc. as above given in the description of the method of making the first catalyst.

Catalyst VII

Another catalyst may be made as follows: About 50 parts by weight of $Cu(VO_3)_2$ and about 50 parts by weight of Bi(VO$_3$)$_3$ are mixed with water and then about 300 parts by weight of kaolin are added and mixed in. The mixture is then boiled to dryness, heated, formed into pellets, etc. as given above in the description of the first catalyst.

Even though particular steps are taken to activate the catalysts above described, by treatment with hydrochloric acid and oxygen, I have found that they do not reach the peak of their efficiency until they have been in use for a substantial period of time, say from 48 to 72 hours or more, as apparently this extended treatment is necessary to establish proper equilibrium conditions of oxygen and chlorine in the compound.

In the catalyst described it will be noted that each comprises a compound of copper, vanadium, chlorine and oxygen and in the examples given additional elements are included as specified. It is understood that these examples are given only by way of illustration and that other and additional combinations and proportions may be employed and other elements may also be included without departing from the spirit of my invention.

This application contains matter derived from my co-pending application Serial No. 89,521, filed July 8, 1936.

What I claim is:

1. In the art of oxidizing hydrochloric acid to chlorine, the step of activating a catalytic mass comprising copper vanadate by subjecting it to the action of hydrochloric acid gas and oxygen at least until the mass is completely reacted with the hydrochloric acid gas and oxygen and no longer absorbs and holds the chlorine radical of the hydrochloric acid.

2. The method specified in claim 1, in which the catalytic mass is first treated with hydrochloric acid gas and oxygen alternately and subsequently hydrochloric acid gas and oxygen are passed through the mass simultaneously.

3. A method as specified in claim 1, in which during at least the latter part of the treatment, the catalytic mass is treated with oxygen and hydrochloric acid gas mixed together in the approximate proportion of about 4 volumes of hydrochloric acid gas for each volume of oxygen.

4. In the art of preparing a catalyst for oxidizing hydrochloric acid to chlorine, the steps of passing hydrochloric acid gas and oxygen through a catalytic mass comprising a compound which includes the elements: copper, vanadium, oxygen and chlorine at a temperature between about 350° C. and 450° C. and in the proportion of between about 3.85 and 4.25 volumes of hydrochloric acid for each volume of oxygen.

5. A catalyst for oxidizing hydrochloric acid to chlorine comprising the reaction products of copper vanadate treated with hydrochloric acid gas and oxygen.

6. A catalyst for oxidizing hydrochloric acid to chlorine consisting essentially of a compound comprising copper, vanadium, chlorine and oxygen and also including in the combination an element selected from the group consisting of magnesium and beryllium.

7. A catalyst for oxidizing hydrochloric acid to chlorine consisting essentially of a compound comprising copper, vanadium, chlorine and oxygen and also including in the combination an element selected from the group consisting of magnesium and beryllium and an element selected from the group consisting of antimony, bismuth and cobalt.

FREDRIK W. DE JAHN.